L. DA ROZIR.
BAKING PAN AND LIFTING ATTACHMENT THEREFOR.
APPLICATION FILED JUNE 5, 1911.
Patented Nov. 21, 1911.
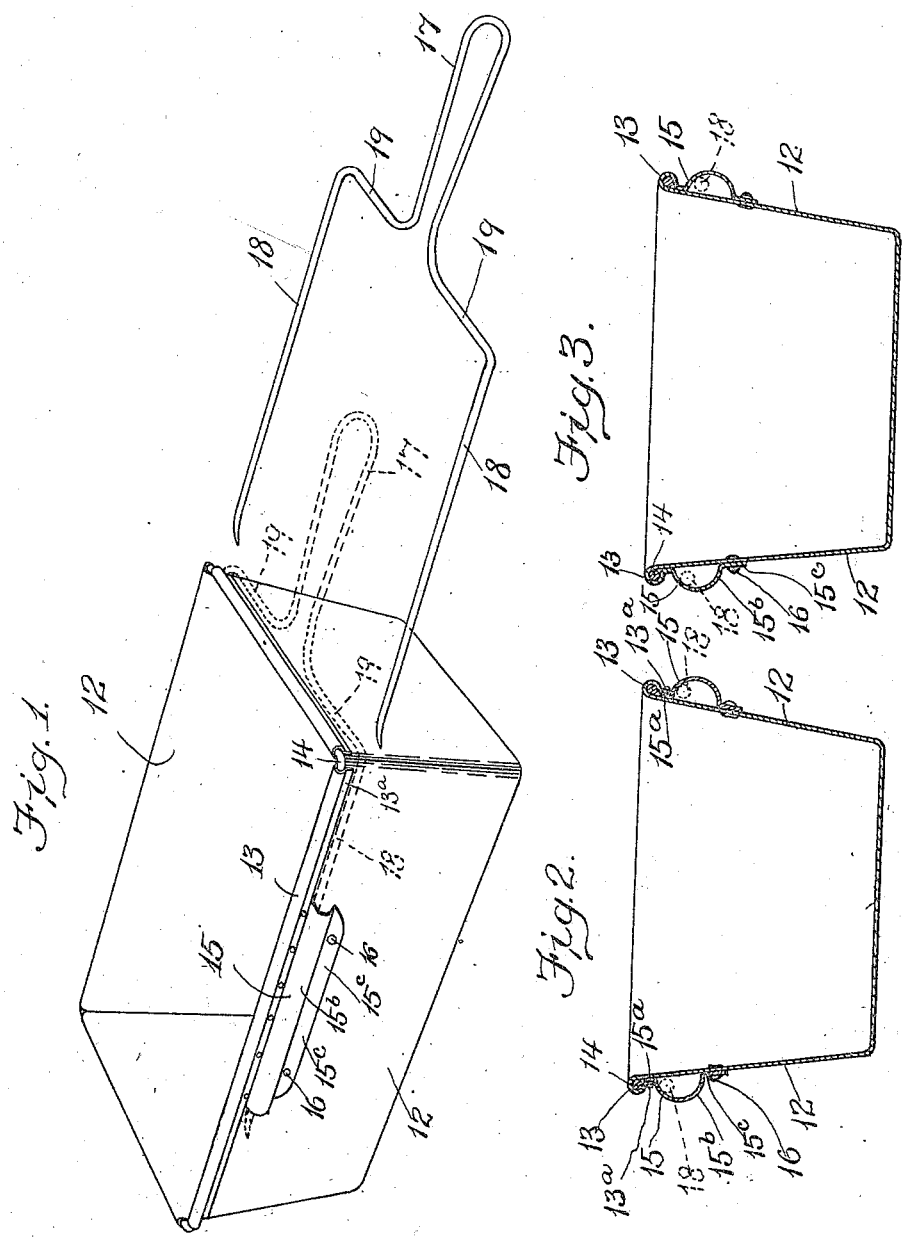
Witnesses:
Inventor:
Levi Da Rozir

UNITED STATES PATENT OFFICE.

LEVI DA ROZIR, OF BROCKTON, MASSACHUSETTS.

BAKING-PAN AND LIFTING ATTACHMENT THEREFOR.

1,009,227.

Specification of Letters Patent. Patented Nov. 21, 1911.

Application filed June 5, 1911. Serial No. 631,288.

*To all whom it may concern:*

Be it known that I, LEVI DA ROZIR, a citizen of the United States, and a resident of Brockton, in the county of Plymouth and State of Massachusetts, have invented certain new and useful Improvements in Baking-Pans and Lifting Attachments Therefor, of which the following is a specification.

This invention relates to baking pans such as are used for baking bread, and having straight opposite sides.

The invention has for its object to enable a pan of this character to occupy not more than the usual space in an oven, and to be removed from the oven when hot without liability of burning the hands of the person manipulating the pan.

The invention consists in the improvements which I will now proceed to describe and claim.

Of the accompanying drawings which form a part of this specification,—Figure 1 represents a perspective view of a baking pan and a lifting attachment therefor embodying my invention, the attachment being shown by full lines separated from the pan, and by dotted lines engaged with the pan to lift and transport the same, Fig. 2 represents a transverse section of the pan, as shown by Fig. 1, Fig. 3 represents a view similar to Fig. 2, showing a slightly different construction.

Similar reference characters indicate the same or similar parts in all the figures.

In the drawings,—12, 12 represent the longer straight sides of a baking pan of ordinary form, the pan being made from a sheet metal blank, the edges of which are preferably rolled outward to form a marginal rib 13 which incloses the usual reinforcing and stiffening wire 14.

15, 15 represent sheet metal lugs which are attached to the sides 12 at points close to the rib 13, and project outwardly from said sides directly under the rib. The lugs 15 may be made in separate pieces having ears 15ª interposed between the sides 12 and lips 13ª on the ribs 13, as shown by Figs. 1 and 2, or the said lugs may be integral with the ribs 13, as shown by Fig. 3. The lugs 15 have extensions 15ᵇ which are bent downwardly and inwardly and terminate in ears 15ᶜ which are rigidly attached to the sides 12 by rivets 16 or otherwise, as by solder. The lugs and their extensions form, with the adjacent portions of the sides 12, straight longitudinal sockets adapted to receive arms on the lifting attachment hereinafter described, and guide said arms to a bearing on the downwardly facing under sides of the lugs, so that the said attachment is adapted to lift and transport the pan.

The lifting attachment comprises a handle portion 17 and two straight parallel arms 18 which are offset in opposite directions and are adapted to be moved endwise from the position shown by full lines to that shown by dotted lines in Fig. 1, and thus caused to bear on the downwardly facing sides of the lugs 15, as indicated by Figs. 2 and 3, a lifting engagement being thus established between the attachment and the pan. The lifting attachment is preferably composed of a single piece of stout wire, the central portion of which is bent to form the handle 17, and necks 19 connecting the handle with the arms 18, the latter being straight and so spaced apart that they are adapted to bear on the downwardly facing sides of the lugs 15.

When the pan is ready to be removed from the oven with a loaf of bread, the operator grasping the handle 17 moves the lifting attachment endwise from the position shown by full lines, Fig. 1, to that shown by dotted lines, thus engaging the arms 18 with the lugs 15. The pan may now be removed from the oven, there being no occasion for the operator's hands to touch the hot pan. If desired, the attachment may be engaged with the pan before depositing the latter in the oven, the attachment being withdrawn from the pan after it has been properly located in the oven, so that the pan does not occupy more than the usual space in the oven, and the handle is kept cool and in readiness for the removal of the hot pan when the bread is baked.

The lugs 15 are stiffened by the ribs 13 and by the extensions 15ᵇ so that there is no liability of their being bent out of shape.

I claim:—

1. A baking pan having straight opposite sides the top edges of which are rolled to form marginal reinforcing ribs, and longitudinally disposed downwardly facing lugs, said lugs being each connected at one edge to one of said sides and its reinforcing rib, the other edge of each lug being also secured to the same side of the pan, in combination with a lifting member provided with parallel arms adapted to engage said lugs.

2. A baking pan having straight opposite sides the top edges of which are rolled to form marginal reinforcing ribs, and longitudinally disposed downwardly facing lugs, said lugs being each integral with one of said reinforcing ribs, the free edge of each lug being secured to the side of the pan, in combination with a lifting member adapted to engage said lugs.

In testimony whereof I have affixed my signature, in presence of two witnesses.

LEVI DA ROZIR.

Witnesses:
C. F. BROWN,
P. W. PEZZETTI.